(12) United States Patent
Dehlin et al.

(10) Patent No.: US 10,290,140 B2
(45) Date of Patent: May 14, 2019

(54) TARGET DETERMINING METHOD AND SYSTEM

(71) Applicant: Vricon Systems Aktiebolag, Linkoeping (SE)

(72) Inventors: Jonas Dehlin, Linkoeping (SE); Patrick Mollbrink, Roenninge (SE)

(73) Assignee: Vricon Systems Aktiebolag, Linkoeping (SE)

( * ) Notice: Subject to any disclaimer, the term of this patent is extended or adjusted under 35 U.S.C. 154(b) by 440 days.

(21) Appl. No.: 14/363,574

(22) PCT Filed: Apr. 14, 2014

(86) PCT No.: PCT/SE2014/050460
§ 371 (c)(1),
(2) Date: Jun. 6, 2014

(87) PCT Pub. No.: WO2015/160290
PCT Pub. Date: Oct. 22, 2015

(65) Prior Publication Data
US 2015/0292881 A1    Oct. 15, 2015

(51) Int. Cl.
*G06T 15/00* (2011.01)
*G01S 19/13* (2010.01)
(Continued)

(52) U.S. Cl.
CPC ............... *G06T 15/00* (2013.01); *F41G 3/02* (2013.01); *F41G 3/06* (2013.01); *G01C 15/02* (2013.01); *G01S 19/13* (2013.01); *G06T 17/05* (2013.01)

(58) Field of Classification Search
CPC . G06T 15/00; G06T 17/05; F41G 3/02; F41G 3/06; G01C 15/02; G01S 19/13
See application file for complete search history.

(56) References Cited

U.S. PATENT DOCUMENTS 5,825,480 A * 10/1998 Udagawa ............. G01C 3/04
356/138
6,064,942 A    5/2000 Johnson et al.
(Continued)

OTHER PUBLICATIONS

International Searching Authority, International Search Report and Written Opinion for International Application No. PCT/SE2014/050460, dated Jan. 27, 2015, 14 pages, Swedish Patent and Registration Office, Sweden.
(Continued)

*Primary Examiner* — Manuel L Barbee
(74) *Attorney, Agent, or Firm* — Alston & Bird LLP

(57) ABSTRACT

The disclosure relates to a system for determining the position of a target. The system comprises a device for determining the position of an observer. The system further comprises a range and direction measuring device. The system even further comprises a coordinate determining module. The coordinate determining module is arranged to receive the position of the observer. The coordinate determining module is further arranged to receive information from the range and direction measuring device. The coordinate determining module is even further arranged to determine initial coordinates of the target based on the position of the observer and the received information from the range and direction measuring device. The system further comprises a wearable presentation device. The wearable presentation device is arranged to receive the determined initial coordinates of the target. The wearable presentation device is further arranged to present a geo-referenced three-dimensional map to the observer. The wearable presentation device is even further arranged to receive input from the observer so as to mark a new position of the target on the geo-referenced three-dimensional map. The wearable presentation device is also arranged to determine final coordinates of the target based on the marked new position of the
(Continued)

target. The disclosure also relates to a method, a computer program and a computer program product for determining the position of a target. The disclosure also relates to a system, a method, a computer program and a computer program product for targeting.

23 Claims, 4 Drawing Sheets

(51) Int. Cl.
    *F41G 3/06*     (2006.01)
    *F41G 3/02*     (2006.01)
    *G06T 17/05*     (2011.01)
    *G01C 15/02*     (2006.01)

(56) References Cited

U.S. PATENT DOCUMENTS

| | | | |
|---|---|---|---|
| 8,049,658 B1 | 11/2011 | Lagonik et al. | |
| 8,159,337 B2 * | 4/2012 | Silver | G06F 17/30241 340/539.13 |
| 8,245,623 B2 * | 8/2012 | Weaver | F41G 3/06 89/200 |
| 8,275,544 B1 | 9/2012 | Wells et al. | |
| 2007/0010965 A1 | 1/2007 | Malchi et al. | |
| 2007/0288156 A1 * | 12/2007 | Neff | F41G 7/343 701/533 |
| 2008/0040036 A1 | 2/2008 | Peters et al. | |
| 2012/0145786 A1 | 6/2012 | Weaver | |
| 2012/0232717 A1 | 9/2012 | Koppie | |

OTHER PUBLICATIONS

European Patent Office, Extended European Search Report for Application No. 14889553.5, dated Nov. 24, 2017, 9 pages, Germany.

* cited by examiner

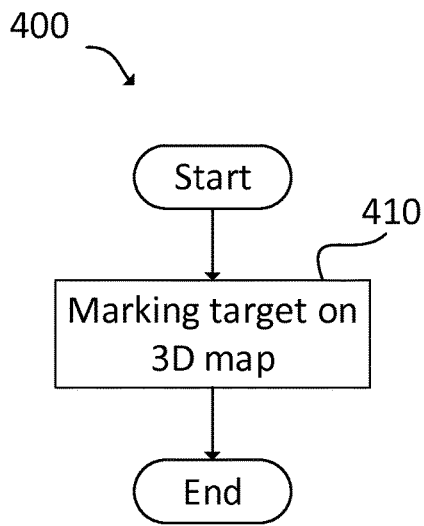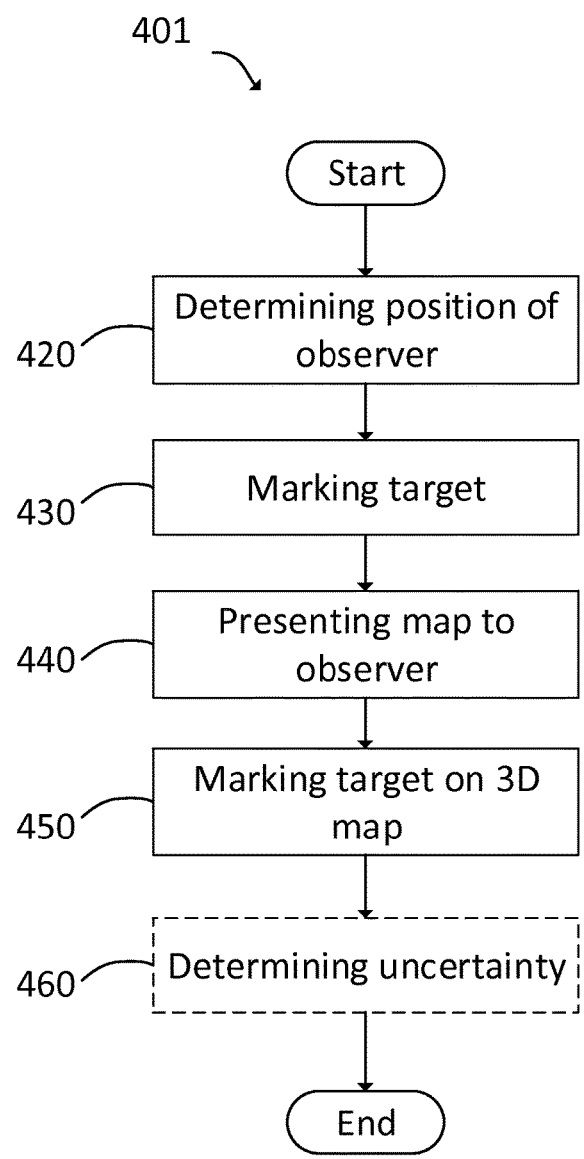
Fig. 2a
Fig. 2b

TARGET DETERMINING METHOD AND SYSTEM

CROSS REFERENCE TO RELATED APPLICATIONS

This application is a National Stage Application, filed under 35 U.S.C. § 371, of International Application No. PCT/SE2014/050460, filed Apr. 14, 2014, the contents of which are hereby incorporated by reference in their entirety.

BACKGROUND

Related Field

The present disclosure relates to a method and a system for determining the position of a target by an observer. It also relates to a method and a system for targeting. It further relates to computer program and a computer program product for determining the position of a target by an observer and for targeting.

Description of Related Art

In both military and civilian applications it is often required to find coordinates of a target. In the military area two methods are common today. One method is based on at least a laser rangefinder, LRF, combined with a digital compass and a satellite based positioning system, like the global positioning system, GPS. Exemplary devices for doing this are so called forward observer systems. Devices like this are rather heavy and they often require a time consuming calibration procedure, in the order of 10-15 minutes, especially if high accuracy is needed for target coordinates. Both time and weight might be crucial in the military area since weight limits the equipment a person can carry and time might be a crucial feature for succeeding a mission, especially for an observer to not being detected.

Another method is based on satellite stereo imagery and a manual or semi-automatic process for establishing an elevation coordinate. The satellite images are geo-positioned based on manually surveyed ground control points. This requires man on the ground for the survey. It also requires time consuming manual labor in the back-office for the stereo correlation.

BRIEF SUMMARY

One object of the present invention is to present an improved method for determining the position of a target.

Another object of the present invention is to present an improved system for determining the position of a target.

Yet another object of the present invention is to present an improved computer program for determining the position of a target.

Yet another object of the present invention is to present an improved computer program product for determining the position of a target.

Yet another object of the present invention is to present an improved method, an improved system, an improved computer program and an improved computer program product for targeting.

One of the objects is achieved by a method for determining the position of a target by an observer. The method comprises marking a position of the target on a geo-referenced three-dimensional map so as to obtain final coordinates of the target through the geo-referenced three-dimensional map.

By marking the position of a target on a geo-referenced three-dimensional (3D)-map an observer needs no heavy equipment like an accurate LRF. Thus an observer has less to carry. No time-consuming calibration procedure is needed either. Thus determining the position of a target goes faster. The 3D-map can be stored on a wearable device. Thus no communication with external units or persons is needed. Therefore the whole process of determining the position of a target can be done by the observer alone. Marking a target on a 3D-map can be performed in a user-friendly way. Thus no big training of an observer for performing the task is needed. The geo-referenced 3D-map allows more or less immediately obtaining the coordinates of a target as soon as it is marked. No mensuration of a certain number of fixed points is needed. Marking a target on a 3D-map allows for the observer to adjust the 3D-map so that he/she can see more or less exactly the same scene or view of a scene on the 3D-map as in reality. Having more or less exactly the same view on the 3D-map as in reality allows marking a target with high accuracy since an observer will be able to adjust the marking so that it coincides with its own understanding of the environment. Especially an observer could mark the target in an accurate relation compared to any references in the scene he/she sees.

In one example the method for determining the position of a target by an observer comprises determining the position of the observer. The method further comprises marking the target with a range and direction measuring device for receiving initial coordinates of the target. The method even further comprises presenting a geo-referenced three-dimensional map to the observer, and marking a position of the target on the geo-referenced three-dimensional map so as to obtain final coordinates of the target through the geo-referenced three-dimensional map.

By doing this the observer gets coordinates of himself/ herself and initial coordinates of the target. This could be used by the observer for easier orientation in the 3D-map. Thus the step of getting a zoom-level and/or of getting the right area to show and/or of getting a viewing angle on the 3D-map so that it is possible to mark the target can be fastened. Since the initial coordinates of the target don't need to be extremely accurate, a range and direction measuring device can be used which needs no or only short calibration time and/or which consists of lighter and/or smaller components. Thus at least one of time, weight and size can be reduced to prior art solutions.

In one example the position of the observer is determined based on a global navigation satellite system.

This allows easy and fast detection of the position of the observer and requires no heavy or bulky equipment.

In one example the view is centred on the initial coordinates of the target when presenting the geo-referenced three-dimensional map to the observer.

This allows the observer for easily orienting him on the 3D-map. Thus it might be especially advantageous in stressful situation. It also shortens the time the observer needs for finding the right place on the 3D-map.

In one example the view is aligned using the bearing from the position of the observer to the position represented by the initial coordinates of the target when presenting the geo-referenced three-dimensional map to the observer.

This allows the observer for easily orienting him on the 3D-map. Thus it might be especially advantageous in stressful situation. It also shortens the time the observer needs for finding the right place on the 3D-map. Finding the right viewing angle might take some time for an untrained user. Getting the right viewing angle automatically is thus an especially time-shortening method. It further allows an especially good possibility for the observer to mark the target on the 3D-map since his/her perception of a scene will coincide which what he/she sees on the 3D-map.

In one example the position of the observer is a three-dimensional position and/or the initial coordinates of the target are three-dimensional coordinates and/or the final coordinates of the target are three-dimensional coordinates.

This allows for a special accurate determination of the position of the target.

In one example the method further comprises determining an uncertainty of the final coordinates of the target based on at least some of the accuracy of the geo-referenced three-dimensional map and the observer's understanding of the target location and its vicinity.

This is an easy and accurate way of determining the uncertainty of the final coordinate of the target. The final uncertainty of the target is then useful for determining what effect a possible attack on the target might cause in the surrounding of the target.

At least some of the objects are also achieved by a method for targeting. The method comprises determining final coordinates of a target. The method further comprises using the determined final coordinates of the target as input in a call-for-fire procedure.

This facilitates targeting processes and allows especially for shortening time spent on them.

One of the objects is also achieved by a system for determining the position of a target. The system comprises a device for determining the position of an observer. The system further comprises a range and direction measuring device. The system even further comprises a coordinate determining module. The coordinate determining module is arranged to receive the position of the observer. The coordinate determining module is further arranged to receive information from the range and direction measuring device. The coordinate determining module is even further arranged to determine initial coordinates of the target based on the position of the observer and the received information from the range and direction measuring device. The system further comprises a wearable presentation device. The wearable presentation device is arranged to receive the determined initial coordinates of the target. The wearable presentation device is further arranged to present a geo-referenced three-dimensional map to the observer. The wearable presentation device is even further arranged to receive input from the observer so as to mark a new position of the target on the geo-referenced three-dimensional map. The wearable presentation device is also arranged to determine final coordinates of the target based on the marked new position of the target.

By marking the position of a target on a geo-referenced three-dimensional (3D)-map an observer needs no heavy equipment like an accurate LRF. Thus an observer has less to carry. No time-consuming calibration procedure is needed either. Thus determining the position of a target goes faster. The 3D-map can be stored on the wearable presentation device. Thus no communication with external units or persons is needed. Therefore determining the position of a target can be done by the observer alone. Marking a target on a 3D-map can be performed in a user-friendly way. Thus no big training of an observer for performing the task is needed. The geo-referenced 3D-map allows more or less immediately obtaining the coordinates of a target as soon as it is marked. No mensuration of a certain number of fixed points is needed. Marking a target on a 3D-map allows for the observer to adjust the 3D-map so that he/she can see more or less exactly the same scene or view of a scene on the 3D-map as in reality. Having more or less exactly the same view on the 3D-map as in reality allows marking a target with high accuracy since an observer will be able to adjust the marking so that it coincides with its own understanding of the environment. Especially an observer could mark the target in an accurate relation compared to any references in the scene he/she sees.

Through the device for determining the position of the observer and through the range and direction measuring device in combination with the coordinate determining module the observer gets coordinates of himself/herself and initial coordinates of the target. This could be used by the observer for easier orientation in the 3D-map. Thus the step of getting a zoom-level and/or of getting the right area to show and/or of getting a viewing angle on the 3D-map so that it is possible to mark the target can be fastened. Since the initial coordinates of the target don't need to be extremely accurate, a range and direction measuring device can be used which needs no or only short calibration time and/or which consists of lighter and/or smaller components. Thus at least one of time, weight and size can be reduced to prior art solutions.

In one example the coordinate determining module is comprised in the wearable presentation device.

This allows for an especially compact construction of the system.

In one example the wearable presentation device is arranged to centre the map on the initial coordinates of the target when the geo-referenced three-dimensional map is presented to the observer.

This allows the observer for easily orienting him on the 3D-map. Thus it might be especially advantageous in stressful situation. It also shortens the time the observer needs for finding the right place on the 3D-map.

In one example the wearable presentation device is arranged to align the view using the bearing from the position of the observer to the position represented by the initial coordinates of the target when the geo-referenced three-dimensional map is presented to the observer.

This allows the observer for easily orienting him on the 3D-map. Thus it might be especially advantageous in stressful situation. It also shortens the time the observer needs for finding the right place on the 3D-map. Finding the right viewing angle might take some time for an untrained user. Getting the right viewing angle automatically is thus an especially time-shortening method. It further allows an especially good possibility for the observer to mark the target on the 3D-map since his/her perception of a scene will coincide which what he/she sees on the 3D-map.

In one example the received information from the range and direction measuring device comprises information relating to a distance between the range and direction measuring device and the target and relating to a direction from the range and direction measuring device to the target.

This allows for easy and fast determination of initial coordinates of the target by the coordinate determining module.

In one example the system further comprises a module for determining an uncertainty of the final coordinates of the target.

The final uncertainty of the target is useful for determining what effect a possible attack on the target might cause in the surrounding of the target.

In one example the module for determining an uncertainty of the final coordinates of the target determines the uncertainty of the final coordinates based on an accuracy of the three-dimensional map and/or the observer's understanding of the target location and its vicinity.

This is an easy and accurate way of determining the uncertainty of the final coordinate of the target.

In one example the range and direction measuring device comprises a laser rangefinder.

This allows for an easy and adequate determination of the distance between the observer and the target. No accurate laser rangefinder is needed. No laser rangefinder is needed which needs long calibration time. By using simple laser rangefinders cost, time and weight can be reduced.

In one example the device for determining the position of an observer uses a global navigation satellite.

This allows easy and fast detection of the position of the observer and requires no heavy or bulky equipment.

At least some of the objects are also achieved by a targeting system. The targeting system comprises a system for determining final coordinates of a target. The targeting system also comprises a target coordinate processing module. The target coordinate processing module is arranged to receive the final coordinates of the target and arranged to use the final coordinates of the target as input for a call-for-fire procedure.

This facilitates a targeting process and allows especially for shortening time spent on it.

One of the objects is also achieved by a computer program comprising a program code for executing the method for determining the position of a target by an observer.

One of the objects is also achieved by a computer program product comprising a program code stored on a computer readable media for executing the method for determining the position of a target by an observer.

At least some of the objects are also achieved by a computer program comprising a program code for executing the method for targeting.

At least some of the objects are also achieved by a computer program product comprising a program code stored on a computer readable media for executing the method for targeting.

BRIEF DESCRIPTION OF THE FIGURES

FIG. 2a shows a flowchart of one example of a method for determining the position of a target by an observer.

FIG. 2b shows a flowchart of one example of an extended method for determining the position of a target by an observer.

DETAILED DESCRIPTION OF VARIOUS EMBODIMENTS

Here, and in the following, when referring to a three-dimensional (3D) map it is always assumed that the 3D-map is geo-referenced, unless explicitly otherwise stated.

Here, and in the whole document the terms position and coordinate are in one example interchangeable and describe the same thing.

Figure 1:
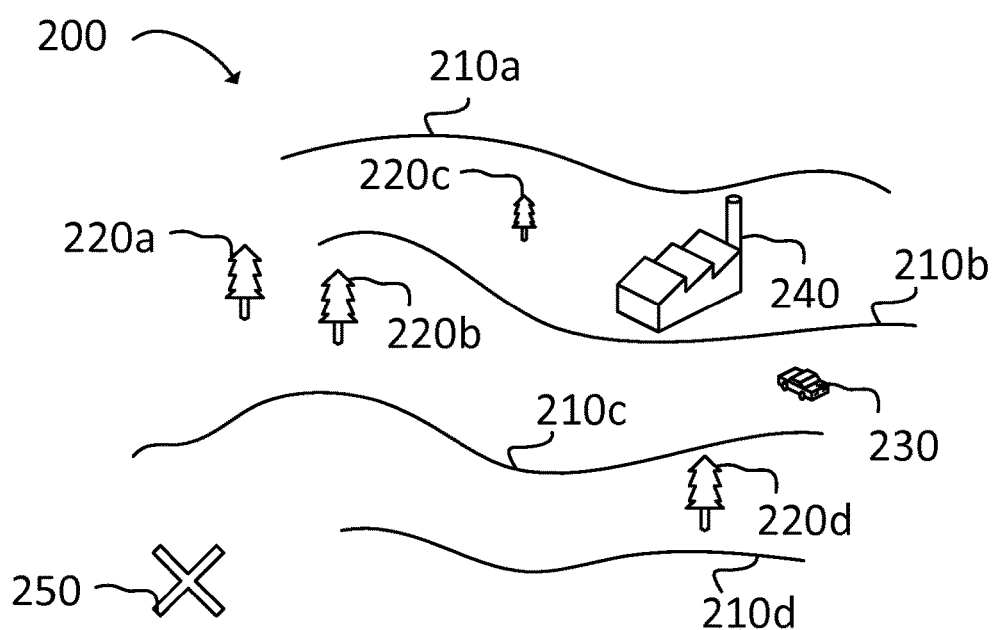
FIG. 1 shows schematically a scene where a method or system according to the present disclosure can be used.

FIG. 1 shows schematically a scene 200 where the present method and system of this disclosure can be used. In the scene 200 lines 210a, 210b, 210c, 210d are used to indicate a hilly environment. These lines 210a, 210b, 210c, 210d could schematically indicate top lines of hills as seen by an observer looking at the scene 200. The observer is in one example standing at the location marked by the cross 250. Although a hilly environment is sketched in the scene 200 this is by no means a requirement. The method and system of this disclosure can in principle be used in any environment, like mountains, hills, plain areas, fields, urban areas, areas with or without vegetation, for just naming a few. In the presented example 200 some trees 220a, 220b, 220c, 220d are marked. Also a vehicle 230 and a building 240 are shown. A typical task for an observer according to the present disclosure is to find out the coordinates of a target. For finding out the coordinates the observer could for example stand at the position marked by the cross 250. The observer could also stand at any other position. A target can be any kind of well-defined object, for example any of the trees 220a, 220b, 220c, 220d, the vehicle 230 or the building 240. In one example the target is an easily movable target 240. In one example the target is stationary target 240. In one example the target is a part of a bigger object, like a door or a window (not shown) of a building 240 or like a chimney of a building 240. The depicted objects in the scene 200 are only examples and by no means exhaustive. Some further examples of possible targets are military targets, like tanks, artillery units, bunkers, factories, infrastructure, convoys, and so on. In one example the coordinates of a target are used for non-military purposes, like surveying. The only requirement is that an observer has a free line of sight between him and the target. Here, the term free line of sight refers to having no obstacles in the line of sight between the observer and the target.

For a better understanding the method is first explained in detail in relation to FIG. 2a and FIG. 2b. FIG. 2a shows a flowchart of a method 400 for determining the position of a target by an observer according to the present invention. The method 400 starts with step 410.

In step 410, a position of the target is marked on a geo-referenced three-dimensional map so as to obtain final coordinates of the target through the geo-referenced three-dimensional map. The geo-referenced map is in one example presented to an observer. The observer marks then the target on the geo-referenced three-dimensional map. Since the three-dimensional map is geo-referenced, marking a position of a target on the map enables to obtain the coordinates of the target. In one example the map is presented on a device. In one example the marking of the position of the target is made on or at the device. In one example the device is a wearable presentation device 340 or 340a as described in relation to FIG. 3. In one example the coordinates of the target are outputted from the device. The coordinates are in one example outputted on a display. In one example the coordinates are outputted through a speaker or another voice generating device. In one example the coordinates are outputted via data transmission. In one example the final coordinates of the target are three-dimensional coordinates.

Marking the position of a target on a three-dimensional map requires no calibration. It neither requires carrying any bigger equipment. A 3D-map can be easily stored on a wearable device. In one example a 3D-map is transmitted to the wearable device. In one example the wearable device is a handheld device. In one example the handheld device is a mobile phone. In one example the handheld device is a device of comparable size and/or weight of a mobile phone. This reduces size and/or weight substantially compared to prior art solution. In one example the size of the device is slightly bigger than a mobile phone to allow a bigger display.

The lack of calibration allows for an observer to basically start without time-delay a marking of the object on the 3D-map. Further, the process of orienting oneself in a 3D-map goes relatively fast since the observer in general has some pre-knowledge about his/her own position. In one example the observer can zoom in and out on a 3D map. In one example the observer can change the angel of view on a 3D-map. In a preferred example the observer centres the 3D-map on the target, or at least approximately centres the 3D-map on the target. In a preferred example the observer adjusts the zoom of the 3D-map so that the 3D-map approximately shows what he/she can see himself/herself when looking in the direction of the target. In a preferred example the observer adjusts the angle of view on the 3D-map so that it corresponds approximately to the viewing direction the observer himself/herself has to the target. By performing at least some of the aforementioned preferred examples the observer will see on the 3D-map approximately the same scene as he/she sees in reality. This allows for accurate marking of the position of the target. Especially if the target is already incorporated in the 3D-map, for example a stationary target like a building 240, the marking of the target can be easily and accurately performed.

In one example the target is not incorporated in the 3D-map. The target is for example not incorporated in the 3D map because the target is a movable target or because the target is a stationary target which was constructed only after the 3D-map was constructed. Having the same scene on the device as in reality enables in this case a good and fast marking of the target as well. This can be illustrated in relation to scene 200 of FIG. 1. The observer might for example stand at the place with the cross 250 and wants to obtain the coordinates of the vehicle 230. Having the same scene on the 3D-map as in reality the observer realises that the vehicle 230 is situated slightly left of the tree 220d from his/her point of view. The observer also realises that the vehicle 230 is right of the building 240. The observer will be able to mark the object at the right left-right relation between building 240 and tree 220d. The object is for example directly in the middle between tree 220d and building, or that the distance of the vehicle 230 to the building 240 is twice the distance of the vehicle 230 to the tree 220d. The observer will then mark the position of the vehicle 230 on the 3D-map in relation to the building 240 and the tree 220d according to his/her observations. Regarding the backward-forward direction, as seen by the observer, the observer might realise that the vehicle is for example in the middle between the hill lines 210b and 210c. Since these lines will be apparent on his/her 3D-map as well the observer will also be able to mark the position of the target well in relation to the backward-forward direction. Since both left-right and backward-forward direction thus could be estimated, a marking of the target on the 3D-map will result in a good coordinates for the target.

The aforementioned scene is of course only illustrative. In general the observer can use any of rivers, mountain or hill silhouettes, buildings, infrastructure, field borders, plants, or anything else as references and estimate the position of the target in relation to this/these references. Since the references are visible in the same scene the 3D-map an accurate marking of the position of the target can by performed by the observer. This enables especially marking of objects which are not close to a reference point, for example an intersection. Instead, even targets somewhere on a huge field can be accurately marked as long as at least some reference point is in the field of view of the observer.

In one example the target is a part of a building. In one example the target is a part of the face of a building, for example a door or a window. Marking the target on a 3D-map allows determining the right coordinates even for those targets. A window on one floor will in general have different coordinates than a window on another floor. Marking the target on a 3D-map thus allows determining the right coordinates of the target in three dimensions. This would not have been possible with 2D-maps or orthoimages.

Marking the target on a 3D-map facilitates also for the observer recognising the surrounding. Being for example in an urban area the observer can see a face of a building on the 3D-map as it appears to him in reality which allows for easy orientation on the 3D-map. It minimises thus further the risk of marking the target at a wrong place on a map.

The method 400 finishes after step 410.

FIG. 2b shows a flowchart of an extended method 401 for determining the position of a target by an observer. The method 401 starts with step 420.

In step 420 the position of an observer is determined. This is in one example done by using a satellite based positioning system like GPS. In one example this is done by other means of positioning, for example based on base stations of a mobile phone system. In one example the position of the observer is determined by some pre-knowledge of the observer. For example, an observer in a specific building might know exactly where he/she is. Any possible method or way of determining the position of an observer can be used in step 420. In one example, the position of the observer is a three-dimensional position. The method continues with step 430.

In step 430 the target is marked with a range and direction measuring device for receiving initial coordinates of the target. In one example the initial coordinates of the target are three-dimensional coordinates. In one example the direction between the observer and the target comprises two angles. The range and direction measuring device is in one example the range and direction measuring device 320 of FIG. 3a. In one example the range and direction measuring device comprises a LRF. In one example the LRF is used for measuring the distance between the observer and the target. The LRF does not need to be of high accuracy as in prior art. The only requirement is that the LRF delivers a rough distance. Thus, small and light weighted LRF can be used. Also if another range and direction measuring device would be used, it does not need to give a high accuracy value for the distance. The range and direction measuring device measures also the direction from the observer to the target. This is in one example done by a gyroscope. In one example this is done by a magnetic compass. Also the direction does not need to be determined at high accuracy. Thus a light and small range and direction measuring device can be used. Knowing the position of the observer and the range and direction from the observer to the target, it is well known in the art how to calculate initial coordinates of the target. The method continues with step 440.

It should be noted that parts of step 430 can be performed before step 420 or simultaneously to step 420. The determination of the range between observer and target and the determination of the direction from the observer to the target can in principle be performed before determining the position of the observer in step 420. Knowledge of the position of the observer is however required before being able to obtain initial coordinates of the target.

In step 440 a geo-referenced 3D-map is presented to the observer. This is in one example done by a wearable presentation device as described later in relation to FIG. 3. In one example the view is centred on the initial coordinates of the target when presenting the geo-referenced three-dimensional map to the observer. In one example the view is aligned using the bearing from the position of the observer to the position represented by the initial coordinates of the target when presenting the geo-referenced three-dimensional map to the observer. Having knowledge of the position of the observer and the initial coordinates of the target as determined in step 420 and step 430, this information can be used to automatically align and/or centre the map as described above. In one example the zoom of the 3D-map is automatically adjusted so that the part of the 3D-map which is presented to the observer is in a user-friendly relation to the field of view of the observer. Having an automatically zoomed and/or aligned and/or centred map frees the observer from doing this so that the observer does not need to orient himself/herself in the 3D-map. Instead, the observer immediately sees on the 3D-map the same scene as in reality. Especially in a stressful situation this can facilitate operations for an observer. It might also be time-saving since using a range and direction measuring device with no need of calibration might be faster to use than orienting oneself via zooming and view changings on a 3D-map. In one example step 440 comprises one or several features which were discussed in relation to step 410 of method 400. In one example step 440 achieves one or several advantages which were discussed in relation to step 410 of method 400. The method 401 continues with step 450.

In step 450 a position of the target is marked on the geo-referenced three-dimensional map so as to obtain final coordinates of the target through the geo-referenced three-dimensional map. How this can be performed and what advantages it has is described in relation to step 410 of method 400. In one example method 401 finishes after step 450. In another example method 401 continues with step 460.

In step 460 an uncertainty of the final coordinates of the target is determined based on at least some of the accuracy of the geo-referenced three-dimensional map and the observer's understanding of the target location and its vicinity. It is understood that the final coordinates of the target can't be more accurate than the accuracy of the geo-referenced 3D-map. Finding out the uncertainty of the final coordinates might be crucial to determine whether an operation should be performed on the target or whether there is too high risk for any collateral damage. The observer will often be in the position to judge how well he/she can estimate the position of the target when marking it on the 3D-map. The observer can for example mark an area on the 3D-map showing that the target is definitely inside this area. Here, the observer can, for example, indicate how well he/she was able to determine the position of the target in relation to one or more references on the 3D-map. The marked area is an example for the observer's understanding of the target location and its vicinity. It is known in the art how errors and/or uncertainties can be added to arrive at a combined uncertainty of a result. The method 401 ends after step 460.

Figure 2C:
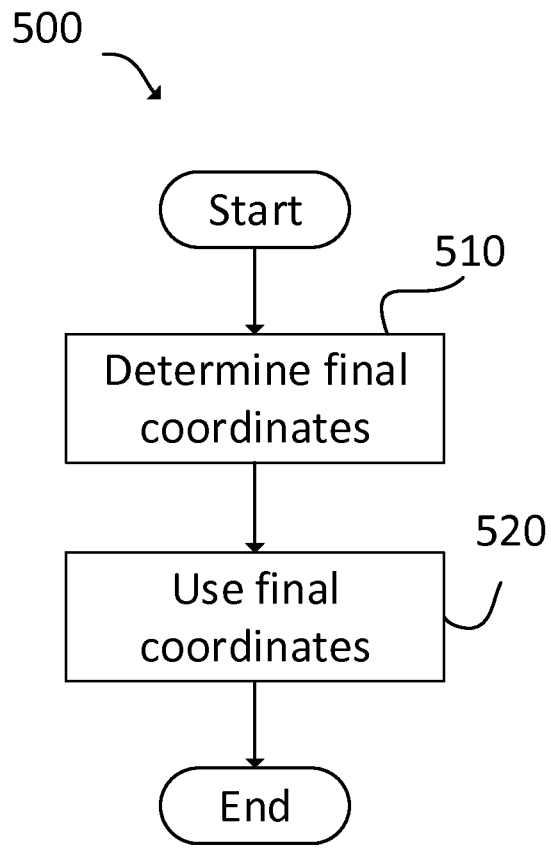
FIG. 2c shows a flowchart of one example of a method for targeting.

FIG. 2c shows a flowchart of a method 500 for targeting. The method starts with step 510.

In step 510 final coordinates of a target are determined. This is preferably done via method 400 or method 401 as described in relation to FIG. 2a and FIG. 2b. The method continues with step 520.

In step 520 the determined final coordinates of the target are used as input in a call-for-fire procedure. In one example the final coordinates are transmitted via the observer. In one example this is done via voice. In one example this is done via typing. In one example the final coordinates are transmitted via a device. In one example the final coordinates are transmitted via a device used in relation with step 510. In one example the final coordinates are transmitted via the presentation device used for presenting the 3D-map. In one example the final coordinates are transmitted wireless. Any other type of transmitting can be used as well and it will be understood that the best way of transmitting might depend on the specific circumstances and available communication channels. In one example the final coordinates are transmitted to an operator of a call-for-fire procedure. In one example the final coordinates are transmitted to a device used in a call-for-fire procedure. In one example the final coordinates are transmitted to a target coordinate processing module 370 as described later in relation to FIG. 3b. Many different call-for-fire procedures are known and it is understood that the final target coordinates in principle can be used as input to any of these procedures. The method 500 finishes after step 520.

Figure 3A:
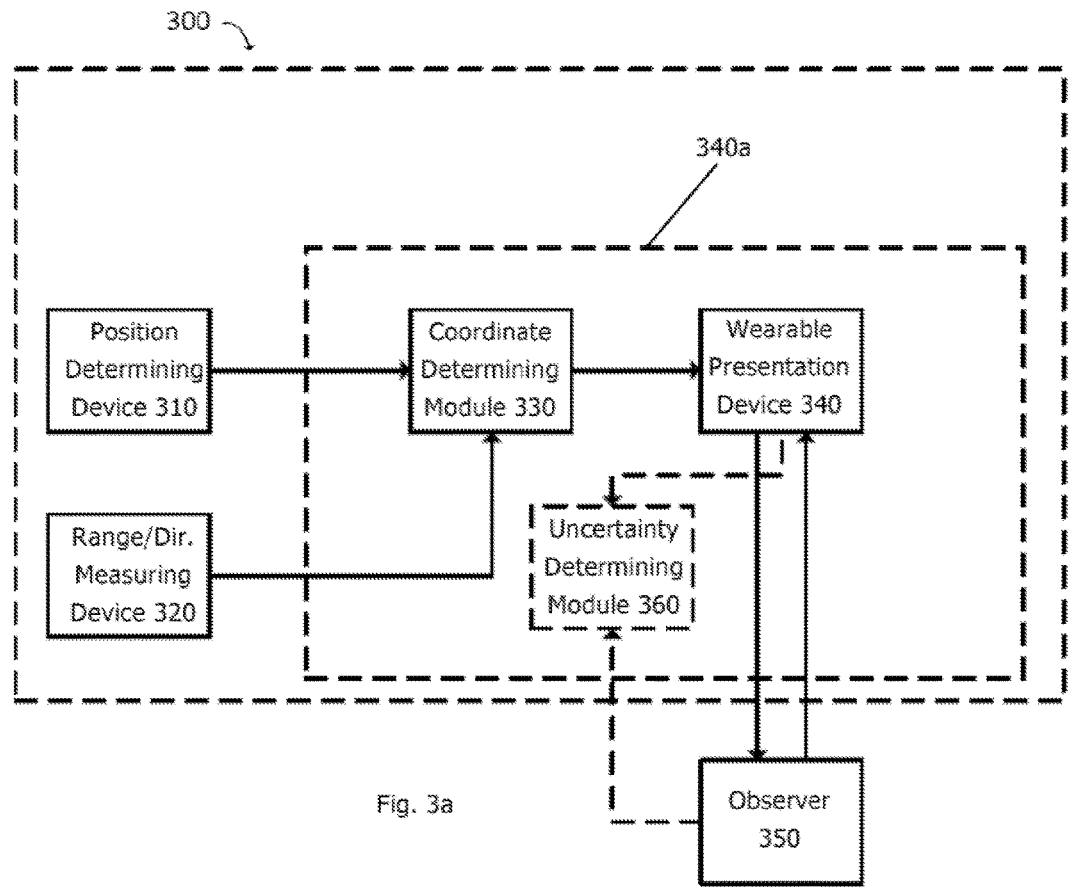
FIG. 3a shows schematically an example of a system for determining the position of a target.

FIG. 3a shows schematically an example of a system 300 for determining the position of a target. The system 300 comprises a device 310 for determining the position of an observer. In one example the device 310 for determining the position of an observer uses a global navigation satellite. The device 310 comprises in one example a GPS-receiver. In one example the device 310 is arranged to determine the position of an observer based on the data received from a global navigation satellite system. However, any other possible devices for determining the position of an observer are possible as well. In one example the device 310 is a map. Preferably the device 310 is a portable, small and lightweight device. In one example, the device 310 is comprised in a range and direction measuring device 320 (not shown in FIG. 3a). In one example the device 310 is comprised in a wearable presentation device 340 or 340a (not shown in FIG. 3a). The device 420 is preferably arranged to determine the position of the observer according to step 420 in method 401.

The system 300 further comprises a range and direction measuring device 320. The range and direction measuring device 320 is preferably arranged to measure a distance between the observer and the target. In one example the range and direction measuring device comprises a laser rangefinder. In one example the laser rangefinder is arranged to measure a distance between the observer and the target. In a preferred example the range and direction measuring device 320 is arranged to determine a direction from the observer to the target. In one example the range and direction measuring device 320 comprises one or several of the properties and/or devices of the range and direction measuring device discussed in relation to step 430 of method 401. In one example the range and direction measuring device 320 shows one or several of the advantages of the range and direction measuring device discussed in relation to step 430 of method 401. In a preferred example the range and direction measuring device is arranged to perform at least parts of step 430 of method 401. In one example the range and direction measuring device is arranged to obtain information relating to a distance between the range and direction measuring device and the target and information relating to a direction from the range and direction measuring device to the target.

The system 300 further comprises a coordinate determining module 330. The coordinate determining module 330 are arranged to receive the position of the observer. In one example the coordinate determining module 330 are arranged to receive the position of the observer from device 310. In one example the coordinate determining module 330 are arranged to receive the position of the observer via the observer. The coordinate determining module 330 are further arranged to receive information from the range and direction measuring device 320. In one example the information received from the range and direction measuring device 320 comprises information relating to a distance between the range and direction measuring device 320 and the target and relating to a direction from the range and direction measuring device 320 to the target. The coordinate determining module 330 are further arranged to determine initial coordinates of the target based on the position of the observer and the received information from the range and direction measuring device 320. In one example the coordinate determining module 330 are comprised in the range and direction measuring device 320 (not shown in FIG. 3*a*). In one example the coordinate determining module 330 are comprised in the wearable presentation device 340 or 340*a*. In one example the coordinate determining module 330 comprise calculation means, for example one or a plurality of processors. In one example the calculation means are the same calculation means which might be comprised in any of the devices 320 and/or 340 and/or 340*a*. In one example the coordinate determining module are arranged to perform at least parts of step 430 as described in relation to FIG. 2*b*.

The system further comprises a wearable presentation device 340. The wearable presentation device is arranged to receive the determined initial coordinates of the target. In one example the wearable presentation device is arranged to receive the initial coordinates of the target from the coordinate determining module 330. In one example the wearable presentation device 340 is arranged to receive the initial coordinates of the target from the observer. The wearable presentation device is further arranged to present a geo-referenced three-dimensional map to the observer 350. In one example the presented 3D-map is centred on the initial coordinates of the target. In one example, the view is aligned using the bearing from the position of the observer to the position represented by the initial coordinates of the target. In one example the wearable presentation device is arranged to perform step 440 of method 401. The wearable presentation device 340 comprises in one example one or several of the properties discussed in relation to step 440 of method 401.

The wearable presentation device 340 is further arranged to receive input from the observer 350 so as to mark a new position of the target on the geo-referenced three-dimensional map. In one example this is performed in accordance to what is described in relation to step 410 of method 400 and/or step 450 of method 401. In one example the wearable presentation device has one or several of the properties and/or advantages described in relation to steps 410 and/or 450. In one example the wearable presentation device 340 is a mobile phone. In one example the wearable presentation device has a similar size as a mobile phone. In one example the wearable presentation device has a touch screen arranged to present the 3D-map to the observer 350 and to receive input from the observer 350 so as to mark a new position of the target. In one example the wearable presentation device 340 comprises input module for receiving input from the observer 350. In one example the wearable presentation device has a screen of bigger size than ordinary mobile phones for facilitating easier target marking from the observer 350. In one example the wearable presentation device 340 is arranged to present information to glasses and/or a head-worn display of an observer 350. The term wearable refers to the possibility of being able to easily transporting the presentation device 340. This means that it is not necessary that the presentation device 340 is stationary at a specific place. It also refers to the fact that the presentation device has the right size and weight to be actually transportable by a human being without any bigger burden, even under longer time. The presented examples of the wearable presentation device 340 fulfil these requirements.

The wearable presentation device 340 is further arranged to determine final coordinates of the target based on the marked new position of the target. Having a marked position on a geo-referenced 3D-map allows conversion of that position into final coordinates. In one example the wearable presentation device comprises calculation means, for example a processor (not shown in FIG. 3*a*).

In one example one or several of the other components of the system 300 are comprised in the wearable presentation device 340. In one example the coordinate determining module 330 are comprised in the wearable presentation device 340*a*.

In one example, the system 300 further comprises a module 360 for determining an uncertainty of the final coordinates of the target. In one example the module 360 for determining an uncertainty of the final coordinates of the target determine the uncertainty of the final coordinates based on an accuracy of the three-dimensional map and/or the observer's understanding of the target location and its vicinity. In one example the module 360 are comprised in the wearable presentation device 340*a*. In one example the module 360 comprises calculation means, for example a processor. In one example the calculation means are the same as the calculation means of the wearable presentation device 340 or 340*a*. In one example several or all possible calculation means from the drawn parts of the system 300 are the same calculation means, i.e. the system 300 comprises one calculation means used from several or all of the parts of the system 300. In one example the module 360 are arranged to determine an uncertainty of the final coordinates of the target as described in relation to step 460 of FIG. 2*b*.

In one example the system 300 further comprises at least one memory (not shown in FIG. 3*a*). In one example the at least one memory is used for storing program code. In one example the stored program code can execute the method for determining the position of the target. In one example the stored program code can execute the method for targeting. In one example the information stored on the at least one memory comprises information related to the geo-referenced 3D-map. In one example all information needed by the wearable presentation device 340 or 340*a* for presenting a 3D-map to the observer is stored on the at least one memory. In one example at least one of the at least one memory is comprised in the wearable presentation device 340 or 340*a*.

Figure 3B:
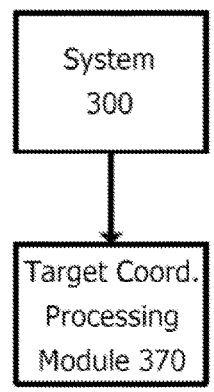
FIG. 3b shows schematically one example of a system for targeting.

FIG. 3*b* shows schematically a system 301 for targeting according to the present disclosure. The system 301 comprises a system 300 for determining final coordinates of a target. The system 300 has been described in relation to FIG. 3*a*. The system 301 further comprises target coordinate processing module 370. The target coordinate processing module 370 is arranged to receive the final coordinates of the target. The target coordinate processing module is further arranged to use the final coordinates of the target as input for a call-for-fire procedure. In one example this is done as described in relation with step 520 of method 500.

The invention claimed is:

1. A method for determining the position of a target by an observer, the method comprising the steps of:
   presenting, to the observer, a geo-referenced three-dimensional map containing initial coordinates, the geo-referenced three-dimensional map being aligned with a reality-based view of the observer so as to present, to the observer, a scene approximately the same as that seen by the observer, the geo-referenced three-dimensional map further containing non-topographical objects depicted three-dimensionally;
   receiving, from the observer, a marking of a position of the target on the geo-referenced three-dimensional map; and
   obtaining final coordinates of the target based at least in part on the marked position of the target within the geo-referenced three-dimensional map.

2. A method for determining the position of a target by an observer, the method comprising the steps of:
   determining the position of the observer;
   marking the target with a range and direction measuring device for receiving initial coordinates of the target;
   automatically aligning and presenting, to the observer, a geo-referenced three-dimensional map containing the initial coordinates, the automatic aligning involving orienting the geo-referenced three-dimensional map with a reality-based view of the observer such that the presented map depicts a scene approximately the same as that seen by the observer;
   receiving, from the observer, a marking of a position of the target on the geo-referenced three-dimensional map; and
   obtaining final coordinates of the target based at least in part on the marked position of the target within the geo-referenced three-dimensional map.

3. The method according claim 2, where the position of the observer is determined based on a global navigation satellite system.

4. The method according to claim 2, where the view is centred on the initial coordinates of the target when presenting the geo-referenced three-dimensional map to the observer.

5. The method according to claim 2, where the view is aligned using the bearing from the position of the observer to the position represented by the initial coordinates of the target when presenting the geo-referenced three-dimensional map to the observer.

6. The method according to claim 2, where the position of the observer is a three-dimensional position and/or the initial coordinates of the target are three-dimensional coordinates and/or the final coordinates of the target are three-dimensional coordinates.

7. The method according to claim 2, further comprising:
   determining an uncertainty of the final coordinates of the target based on at least some of the accuracy of the geo-referenced three-dimensional map and the observer's understanding of the target location and its vicinity.

8. A method for targeting, the method comprising:
   determining final coordinates of a target according to the steps of claim 2; and
   transmitting the determined final coordinates of the target to a device used in a call-for-fire procedure so that the determined final coordinates are used as input in the call-for-fire procedure.

9. A computer program comprising at least one non-transitory computer-readable storage medium having a program code stored therein, the program code comprising at least one executable portion configured for executing the method for determining the position of a target by an observer according to claim 2.

10. A computer program product comprising a program code stored on a non-transitory computer readable media for executing the method for determining the position of a target by an observer according to claim 2.

11. The method of claim 2, wherein the geo-referenced three-dimensional map further containing non-topographical objects depicted three-dimensionally, the non-topographical objects including at least one building.

12. A system for determining the position of a target, the system comprising:
   a device for determining the position of an observer;
   a range and direction measuring device;
   a coordinate determining module configured to:
      (i) receive the position of the observer;
      (ii) receive information from the range and direction measuring device; and
      (iii) determine initial coordinates of the target based on the position of the observer and the received information from the range and direction measuring device; and
   a wearable presentation device configured to:
      (i) receive the determined initial coordinates of the target;
      (ii) present, to the observer, a geo-referenced three-dimensional map containing the determined initial coordinates, the geo-referenced three-dimensional map being automatically aligned, for presentment, with a reality-based view of the observer;
      (iii) receive input from the observer so as to mark a new position of the target on the geo-referenced three-dimensional map containing the determined initial coordinates; and
      (iv) obtain final coordinates of the target based at least in part on the marked new position of the target within the geo-referenced three-dimensional map.

13. The system according to claim 12, where the coordinate determining module is comprised in the wearable presentation device.

14. The system according to claim 12, where the wearable presentation device is configured to centre the map on the initial coordinates of the target when the geo-referenced three-dimensional map is presented to the observer.

15. The system according to claim 12, where the wearable presentation device is configured to align the view using the bearing from the position of the observer to the position represented by the initial coordinates of the target when the geo-referenced three-dimensional map is presented to the observer.

16. The system according to claim 12, where the received information from the range and direction measuring device comprises information relating to a distance between the range and direction measuring device and the target and relating to a direction from the range and direction measuring device to the target.

17. The system according to claim 12, the system further comprises a module for determining an uncertainty of the final coordinates of the target.

18. The system according to claim 17, where the module for determining an uncertainty of the final coordinates of the target determine the uncertainty of the final coordinates based on an accuracy of the three-dimensional map and/or the observer's understanding of the target location and its vicinity.

19. The system according to claim 12, where the range and direction measuring device comprises a laser rangefinder.

20. The system according to claim 12, where the device for determining the position of an observer uses a global navigation satellite.

21. A targeting system, comprising:
a system configured for determining final coordinates of a target according to claim 12; and
a target coordinate processing module configured to:
receive the final coordinates of the target; and
input the final coordinates of the target into a call-for-fire procedure.

22. A computer program comprising at least one non-transitory computer-readable storage medium having a program code stored therein, the program code comprising at least one executable portion configured for executing the method for targeting according to claim 12.

23. A computer program product comprising a program code stored on a non-transitory computer readable media for executing the method for targeting according to claim 12.

* * * * *